(12) United States Patent
Morrissett

(10) Patent No.: US 9,816,605 B2
(45) Date of Patent: Nov. 14, 2017

(54) METHOD OF MITIGATING OVERSHOOT IN TRANSMISSION SHIFT SELECTOR

(71) Applicant: FORD GLOBAL TECHNOLOGIES, LLC, Dearborn, MI (US)

(72) Inventor: Donald Morrissett, Grosse Pointe Woods, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 85 days.

(21) Appl. No.: 14/687,066

(22) Filed: Apr. 15, 2015

(65) Prior Publication Data

US 2015/0219207 A1    Aug. 6, 2015

Related U.S. Application Data

(62) Division of application No. 12/916,466, filed on Oct. 29, 2010, now Pat. No. 9,032,830.

(51) Int. Cl.
| | |
|---|---|
| *F16H 59/02* | (2006.01) |
| *B21D 53/88* | (2006.01) |
| *F16H 59/10* | (2006.01) |
| *F16H 61/24* | (2006.01) |

(52) U.S. Cl.
CPC ......... *F16H 59/0278* (2013.01); *B21D 53/88* (2013.01); *F16H 59/10* (2013.01); *F16H 61/24* (2013.01); *B23P 2700/50* (2013.01); *F16H 2061/247* (2013.01); *Y10T 29/49* (2015.01); *Y10T 29/49872* (2015.01); *Y10T 74/2011* (2015.01); *Y10T 74/20116* (2015.01)

(58) Field of Classification Search
CPC ......... Y10T 29/49872; Y10T 74/20116; Y10T 74/2011; F16H 59/0278; F16H 59/10; F16H 61/24; B23P 2700/50; B21D 53/88
See application file for complete search history.

(56) References Cited

U.S. PATENT DOCUMENTS

| | | |
|---|---|---|
| 505,804 A | 9/1893 | Viering |
| 4,633,728 A | 1/1987 | May |
| 4,919,242 A | 4/1990 | Muramatsu et al. |
| 5,289,907 A | 3/1994 | Pattock |
| 5,946,976 A | 9/1999 | Miyoshi et al. |
| 7,779,715 B2 * | 8/2010 | Mitteer ............ F16H 61/22 74/473.22 |
| 8,459,136 B1 * | 6/2013 | Thomson ............ F16H 59/10 74/473.21 |
| 2006/0016286 A1 | 1/2006 | Dejonge |

FOREIGN PATENT DOCUMENTS

JP          03223566          2/1991

* cited by examiner

*Primary Examiner* — Jermie Cozart
(74) *Attorney, Agent, or Firm* — James Dottavio; MacMillan, Sobanski & Todd, LLC

(57) ABSTRACT

The present disclosure relates to various shift selector assemblies having a shift gate with a plurality of indentations corresponding to transmission shift selections. At least one of the indentations is configured to have a flexible depth so as to selectively restrict and accept a pawl pin, thereby mitigating shift position overshoot.

9 Claims, 4 Drawing Sheets

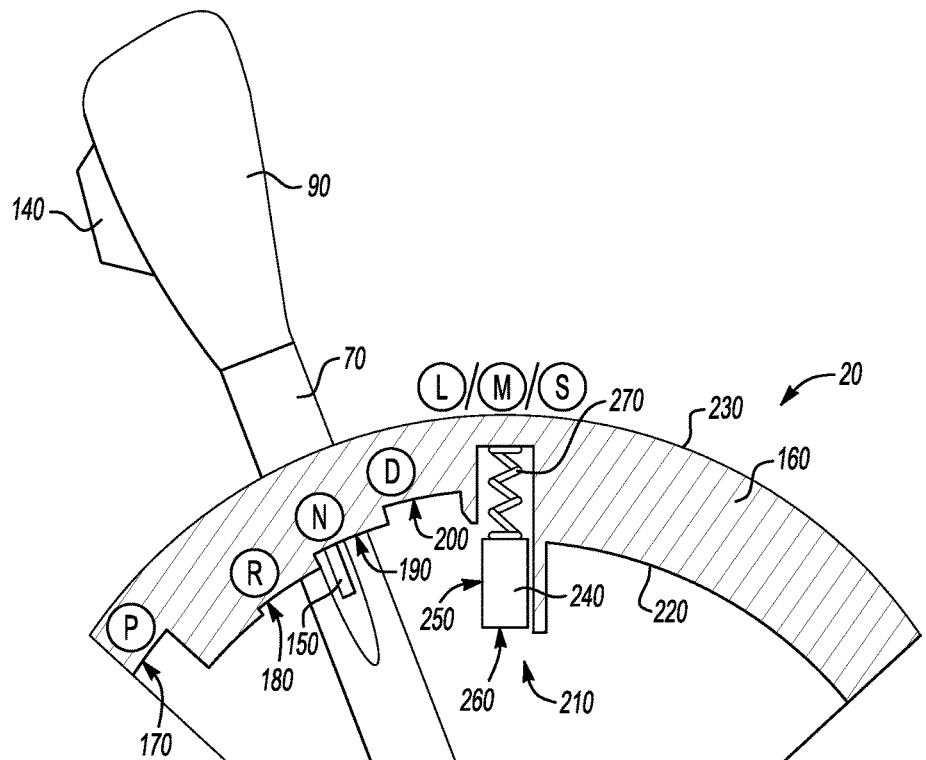
Fig-2
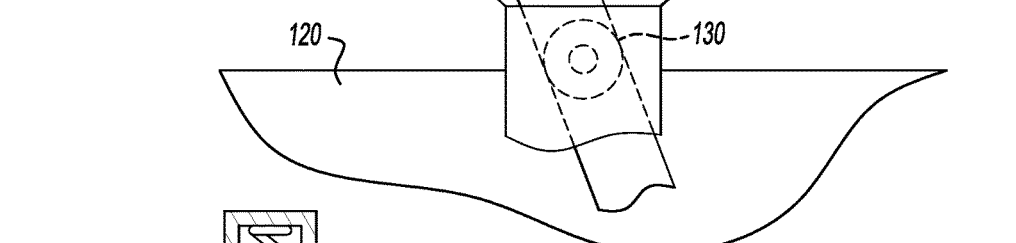
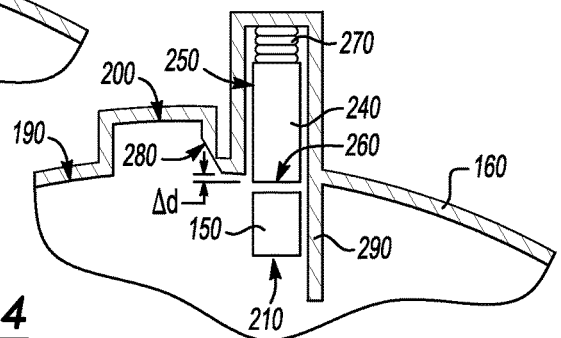
Fig-3
Fig-4

METHOD OF MITIGATING OVERSHOOT IN TRANSMISSION SHIFT SELECTOR

CROSS REFERENCE TO RELATED APPLICATIONS

The present patent application claims the benefit of and is a divisional of U.S. patent application Ser. No. 12/916,466, filed Oct. 29, 2010, now U.S. Pat. No. 9,032,830 B2 which is incorporated herein by reference.

TECHNICAL FIELD

The present disclosure relates to transmission shifter assemblies configured to mitigate shift-position overshoot.

BACKGROUND

Conventional vehicles with automatic transmissions have a transmission shifter assembly that translates user commands for transmission operation to the transmission. In modern vehicles, the shifters can be mechanically or electrically controlled. With mechanical systems a user moves a shift lever to a position that correlates with a transmission mode of operation (e.g., park ("P"), reverse ("R"), neutral ("N"), drive ("D") and low drive ("L/M")). The shifter assembly includes a shift gate with indentations that correspond to each lever position and transmission mode of operation. The user presses a button on the shift lever that releases a pawl-to-gate connection, the lever is free to move with respect to the shift gate and the user releases the button once the shift lever is in the intended position to lock the lever in place.

Overshoot of an intended shift position can occur when the user moves the shift lever too fast or too aggressively. Overshoot depends on the speed of the shift, how aggressive the user is when shifting, and how the release button is pressed. One U.S. Patent Publication No. 2009/0272216 titled, "Shift Selector Apparatus" teaches a shift assembly that manages shift overshoot by designing a shift path with a wide intermediate spatial break (or "bump zone") that divides and first and second shift zone. This arrangement, however, requires significantly more space for the shifter assembly.

Other solutions involve creating an artificial feel of the shift event through changes to the shifter lever. Another published patent application includes a damper that provides resistance to movement of the lever in order to counterbalance faster movement of the shift lever—Japanese Patent Application Publication No. JP 03223566 titled "Shift Indicating Device for Automatic Transmission." This design involves spring biasing the shift lever to resolve overshoot which can be complicated, require more parts and greater durability thresholds for those parts. Overshoot is more simply managed in the shift gate than in the shift lever as doing so does not compromise shift lever performance or feel.

Therefore, it is desirable to have a more compact, simpler shifter assembly that is configured to mitigate overshoot in the shift path in at least one direction.

SUMMARY

The present invention may address one or more of the above-mentioned issues. Other features and/or advantages may become apparent from the description which follows.

Certain embodiments of the present invention relate to a transmission shift gate assembly, including: a plurality of indentations corresponding to shift selections and a spring-loaded member included in an indentation configured to have a flexible depth so as to selectively restrict and accept a pawl pin. The spring-loaded member is a retractable plunger. At least one of the indentations is configured to have a flexible depth so as to selectively restrict and accept a pawl pin.

Another embodiment of the present invention relates to a transmission shift selector, including: a base; a shift lever pivotally coupled to the base; a shift gate having a plurality of indentations corresponding to a shift selection; and a pawl pin coupled to the shift lever, matable with the indentations; and a spring-loaded member included in the indentation configured to have a flexible dept. The spring-loaded member is a retractable plunger. At least one of the indentations is configured to have a flexible depth so as to selectively restrict and accept the pawl pin.

Another exemplary embodiment of the present invention relates to a method of mitigating overshoot in a transmission shift selector, the method includes: forming a shift gate with a plurality of indentations that correspond to different shift selections; and altering the depth of at least one indentation in the shift gate between a restricted position and a receptive position. The restricted position mitigates overshoot in a first direction and the receptive position mitigates overshoot in a second direction.

One advantage of the present teachings is that they minimize the opportunity for the driver to overshoot a shift position when shifting in either a forward or a rearward direction.

Another advantage of the present teachings is that more packaging space is available in the vehicle since the shift gate and shift assembly are relatively compact while still mitigating shift position overshoot.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

BRIEF DESCRIPTION OF THE DRAWINGS

FIG. 2 is a partial cross-sectional view of the shifter assembly of FIG. 1.

FIG. 3 is a partial cross-sectional view of the shifter assembly of FIG. 2 with a shift gate indentation in a restriction depth.

FIG. 4 is a partial cross-sectional view of the shifter assembly of FIG. 2 with the shift gate indentation in a reception depth.

Figure 1:
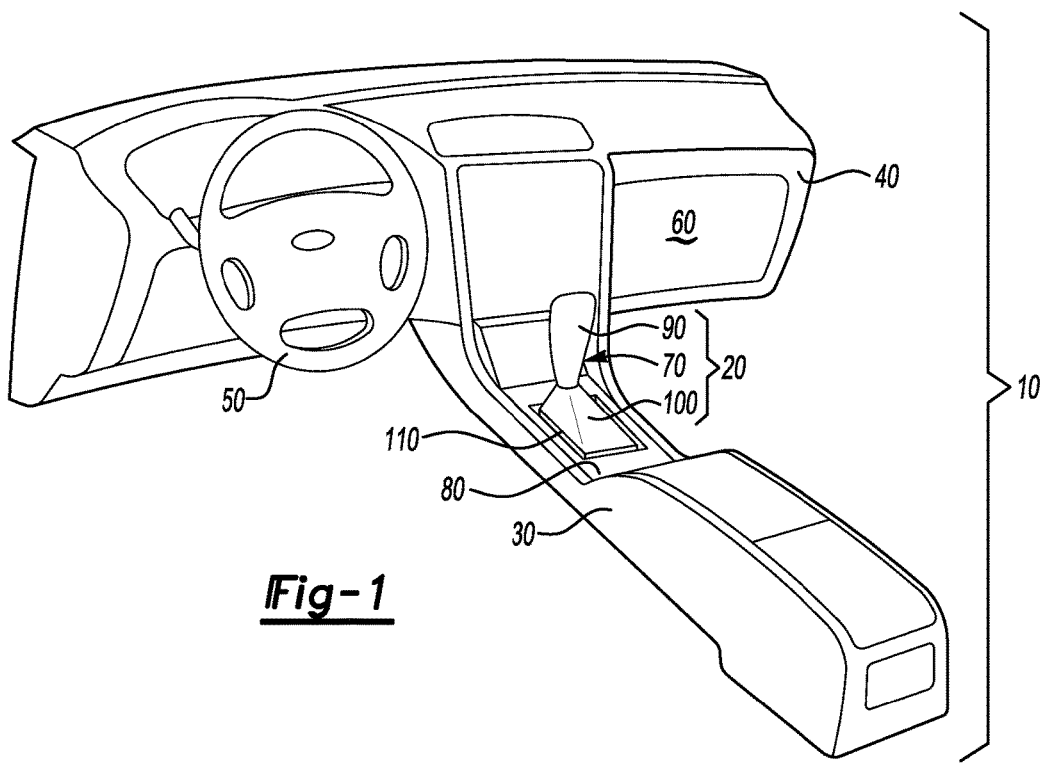
FIG. 1 illustrates a perspective view of a vehicle interior having an exemplary floor-mounted shift selector assembly therein.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings wherein like characters represent the same or corresponding parts throughout the several views there are shown exemplary transmission shift selector assemblies. Shifter assemblies enable the driver to control the mode of transmission operation. Shifter includes a user input device (e.g., a shifter lever) that is connected to various electrical and mechanical transmission components positioned below the input device. The shift selector assemblies are beneficial in that a shift gate has a shift path with at least one flexible indentation, thereby reducing shift position overshoot in one or more directions. One common user issue is unintended selection of a shift position (e.g., low/manual/3/2/1) when shifting from another shift position (e.g., park to drive). The shift selectors are compatible with mechanical and electro-mechanical shift assemblies used with either automatic or manual transmissions. The transmission can be any conventional transmission such as, for example, a continuously variable or an electrically variable transmission. Moreover, while the illustrated embodiments relate to floor-mounted shift selectors, steering column mounted shift selectors can be used with the present teachings.

Referring now to FIG. 1, there is shown therein a vehicle interior 10 having a shift selector assembly 20 mounted to a floor console 30. The vehicle interior 10 includes an instrument panel 40. The instrument panel 40 spans across the front end of a vehicle; the panel 40 includes a steering wheel 50 and storage compartment 60. The floor console 30 is attached to a floor pan of the vehicle (e.g., 120 as shown in FIG. 2).

In a front section of the floor console the shifter selector assembly 20 is mounted to the floor console 30. Shift selector assembly 20 includes a shift lever 70 to enable a vehicle driver to change the transmission mode of operation. The front section of the console 30 includes a finish panel 80 through which the shifter lever 70 extends. In this embodiment, shifter assembly 20 is for an automatic transmission. At the exposed end, shift lever 70 includes a shift knob 90. The shifter assembly 20 includes a housing 100 attached to the shift lever 70. In the shown embodiment, housing 100 is a boot composed of a fluid resistant material. Housing 100 is attached to the console 30 through a retainer ring 110 positioned between the housing 100 and the console 30. Shift selector is capable of selective several modes of operation for the vehicle transmission as discussed herein below.

FIG. 2 illustrates a partial cross-sectional view of the shift selector assembly 20 of FIG. 1. The shifter assembly 20 includes the shift lever 70 through which a user indicates instruction for transmission mode of operation. Shift lever 70 is pivotally connected to the floor pan 120 or base of the assembly and is configured to rotate about point 130. The lever 70 includes knob 90 at the top that has a release button 140 that the user can press to drive the position of a lock or pawl pin 150. The pawl pin 150 is coupled to the shift lever 70 and configured to rotate with the lever. Pawl pin 150 is matable with a number of shift position indentations (or detents) in a shift gate 160. When the pawl pin 150 engages an indentation the pawl locks the shifter lever into the relative shift position.

A five-position automatic transmission shift gate 160 is shown in FIG. 2. The shift gate includes a shift path defined by five indentations 170, 180, 190, 200 and 210. From the front portion of the shift gate to the rear are the following shift positions: park-reverse-neutral-drive-low/manual/sport (or "P-R-N-D-L/M/S"). Each of the indentations 170, 180, 190, 200 and 210 corresponds to a shift selection. Each indentation 170, 180, 190, 200 and 210 also defines a depth or relative distance from an inner surface 220 of the shift gate to an outer surface 230 of the shift gate. Depth is a radial dimension and measured in a direction relative to the shift lever position when positioned at the respective indentation.

In the illustrated embodiment, when overshoot occurs the intended shift position is drive or "D" but the shift lever 70 lands in the low manual position or "L/M/S." Typically a driver would have to retrace their steps and shift forward to remedy the overshoot. Overshoot results from a very small difference between the depth of two or more indentations—e.g., the drive front wall at indentation 190 and low/manual front wall at indentation 200, as shown in FIG. 2. In this embodiment, there is overshoot potential when the user starts from indentation 170 and shifts to indentation 200 (or park to drive).

The illustrated embodiment of FIG. 2 addresses overshoot by adding a spring-loaded member, in this case a retractable plunger 240, in indentation 210 or the L/M/S position. The plunger 240 extends from the rear of the L/M/S indentation 210 to the rear of the drive indentation 200. Surface 250 acts as a wall to prevent overshoot from P-to-D when the plunger 240 is in the restriction position (as shown in FIG. 2). Surface 260 defines the depth of the indentation 210. Since surface 260 is movable with respect to the floor pan 120, indentation 210 has a flexible depth, as comparatively shown in FIGS. 3 and 4. Surface 260 engages the pawl pin 150 when the plunger 240 is retracted. The plunger 240 is spring-loaded and biased toward a downward position or restricted position when the spring 270 is uncompressed.

FIGS. 3 and 4 show three indentations in the shift gate assembly with indentation 210 defining a restriction depth and reception depth, respectively. Plunger 240 is retractable, when spring 270 is compressed surface 260 on plunger is positioned at a greater depth than when in the restricted position, as shown in FIG. 3. The restriction depth is less than the reception depth—i.e., when the spring 270 is compressed. In the restricted position plunger 240 has a depth that is less than the depth of indentation 190 or indentation 200. Since indentation 210 is shallower than indentations 190 and 200 it is more difficult to overshoot indentation 200 when shifting rearward. When pawl 150 is engaged with the indentation 210, the depth of indentation 210 is still less than the depth of indentation 190. The difference in depth between indentations 190 and 210, delta d, is within a predetermined range. The range is ergonomically derived so that the difference in depth between indentations 190 and 210 is not so great that the user fails to detect indentation 200 when shifting in a forward direction. In this embodiment, the depth of indentation 210 is within +/−25% of the depth of indentation 190. An exemplary depth for indentation 190 is 7 millimeters and an exemplary depth for indentation 210 in the reception position is 6 millimeters. In other embodiments, different shift positions are assigned to the shift gate indentations. Shift gate 160 can include more or less than five shift positions and overshoot can be similarly mitigated with respect to any one of the shift positions.

Shift gate 160 includes a chamfered edge 280 between indentations 200 and 210 to further guide pawl pin 150 into engagement with indentation 200 during forward travel of the shift lever 70 from indentation 210. In this embodiment, chamfered edge 280 is approximately 1 millimeter in length or 45 degrees.

A reinforcement surface 290 is also included in the gate 160, of FIGS. 3 and 4, at indentation 210. Reinforcement surface 290 is extended from the inner surface 220 of shift gate 160 to give greater structural rigidity to the gate during repetitive shifting. In this embodiment, the shift gate 160 and reinforcement surface 290 are composed of the same material—a hard plastic. Shift gate 160 is molded in an injection molding process. The plunger 240 is secured to the shift gate 160 in a secondary process with a fastener (e.g., a rivet, screw, weld or glue). Shift gate 160 can also be formed from a solid plastic or other material. In other embodiments, reinforcement surface 290 is composed of a different material than shift gate 160 (e.g., an epoxy, metal or rubber material).

Figure 5:
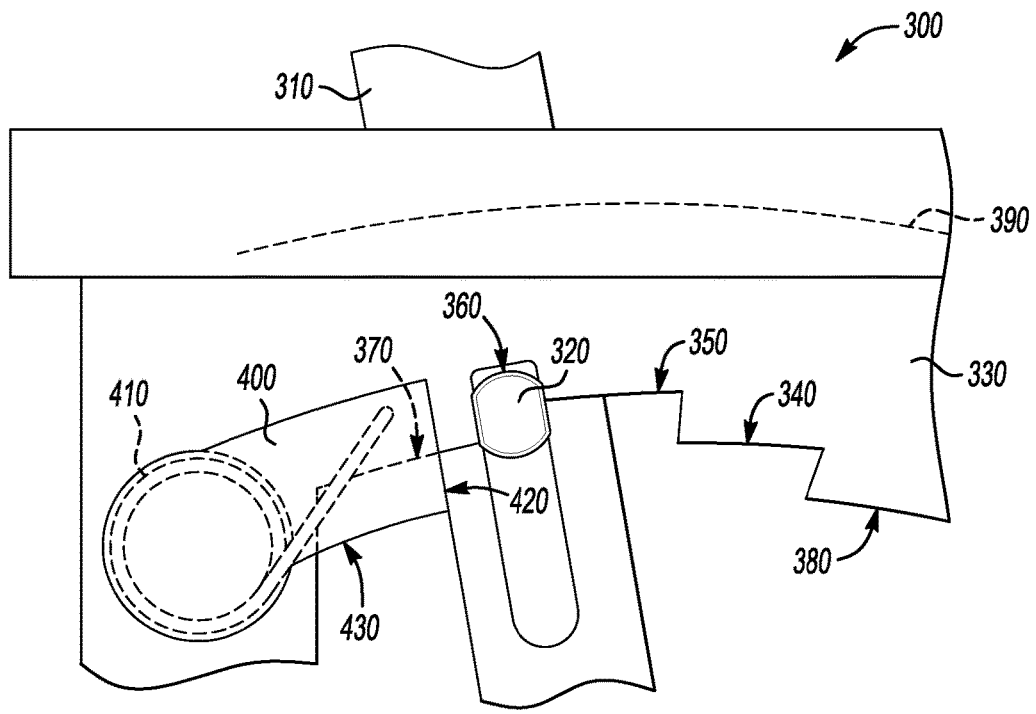
FIG. 5 is a cross-sectional view of another exemplary shifter assembly with a shift gate indentation arm in a restriction depth.

Referring now to FIG. 5 there is shown therein a partial cross-sectional view of another shift selector assembly 300. The shifter assembly 300 includes a shift lever 310 through which a user indicates instruction for transmission mode of operation. Shift lever 310 is pivotally connected to the floor pan or base of the assembly. The lever 310 includes a knob with release button that drives the position of a pawl pin 320. Pawl pin 320 is matable with a number of shift position indentations (or detents) in the shift gate.

An automatic transmission shift gate 330 is partially shown in FIG. 5. The shift gate 330 includes a shift path defined by indentations 340, 350, 360 and 370. Each of the indentations 340, 350, 360 and 370 corresponds to a shift selection and each indentation also defines a depth or relative distance from an inner surface of the shift gate 380 to an outer surface of the shift gate 390.

A spring-loaded member 400 is added in indentation 370 as shown in FIG. 5. The spring-loaded member 400 is an arm configured to pivot with respect to the shift gate 330. The arm 400 is spring-mounted to the shift gate 330 by a rotational spring 410. Surface 420 acts as a wall to prevent overshoot of indentation 360 when the arm 400 is in the restriction position (as shown in FIG. 5). Surface 430 defines the depth of the indentation 370. Since surface 430 is movable with respect to the floor pan or shift gate 300, indentation 370 has a flexible depth. Surface 430 engages the pawl pin 320 when the arm 400 is rotated upward and spring 410 is compressed. The arm 400 is biased toward a downward position or restricted position when the spring 410 is uncompressed.

Figure 6:
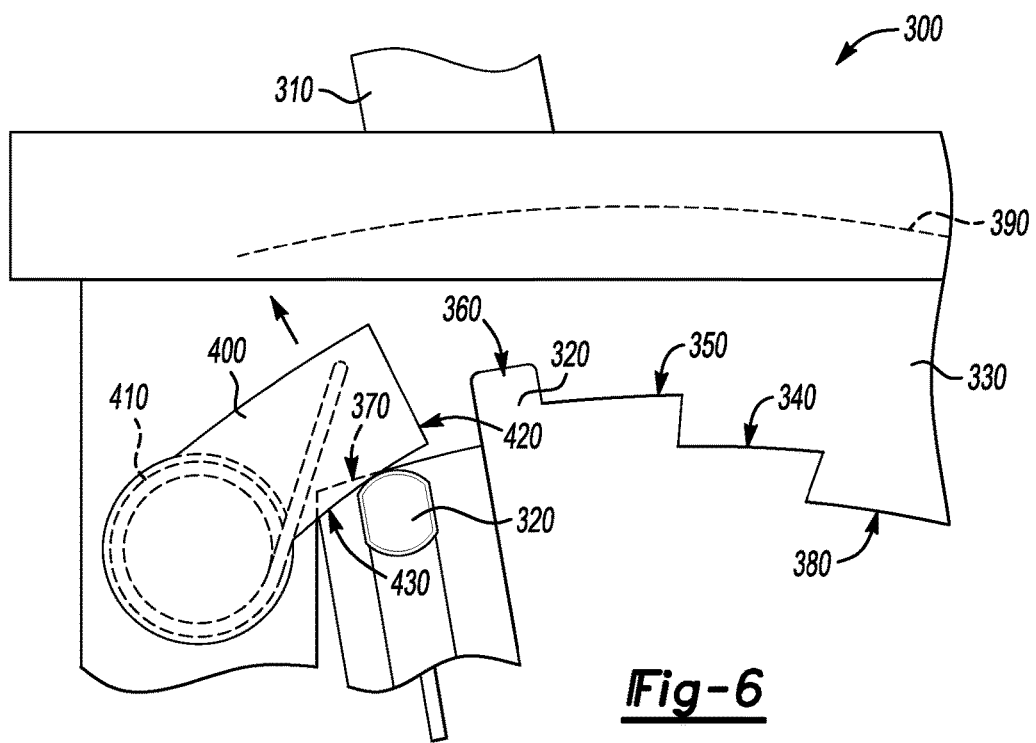
FIG. 6 is a cross-sectional view of another exemplary shifter assembly with the shift gate indentation arm of FIG. 5 in a reception depth.

FIGS. 5 and 6 show indentation defining a restriction depth and reception depth, respectively. Arm 400 is retractable, when spring 410 is compressed surface 430 on arm is positioned at a greater depth than when in the restricted position. The restriction depth is less than the reception depth—i.e., when the spring 410 is compressed. In the restricted position, as shown in FIG. 5, arm 400 has a depth that is less than the depth of indentation 360 or indentation 350. Since indentation 370 is shallower than indentations 350 and 360 it is more difficult to overshoot indentation 360. When pawl 320 is engaged with the indentation 370, the depth of indentation 370 is still less than the depth of indentation 350. The difference in depth between indentations 370 and 350 is within a predetermined range e.g., within +/−40% of the depth of indentation 350. An exemplary depth for indentation 350 is 9 millimeters and an exemplary depth for indentation 370 in the reception position is 7 millimeters.

Figure 7:
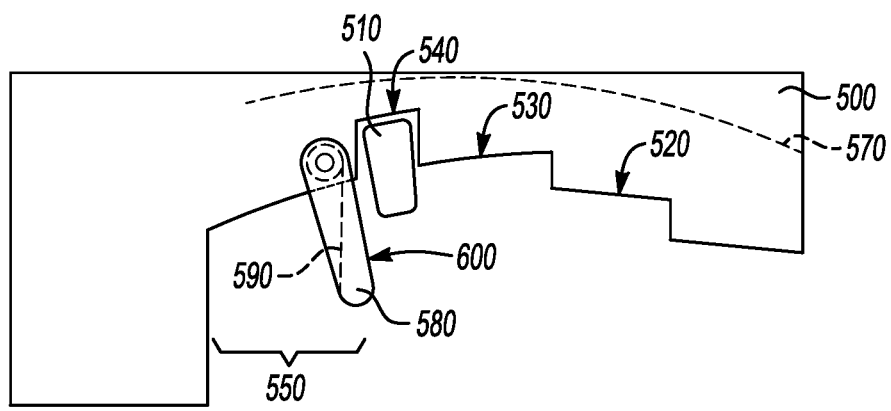
FIG. 7 is a cross-sectional view of another exemplary shifter assembly with a shift gate indentation arm in a restriction depth.

Referring now to FIG. 7 there is shown therein a partial cross-sectional view of another shift selector assembly shift gate 500. A pawl pin 510 is matable with a number of shift position indentations (or detents) in the shift gate. The transmission shift gate 500 is partially shown in FIG. 7. The shift gate 500 includes a shift path defined by indentations 520, 530, 540 and 550. Each of the indentations 520, 530, 540 and 550 corresponds to a shift selection and each indentation also defines a depth or relative distance from an inner surface of the shift gate 560 to an outer surface of the shift gate 570.

A spring-loaded member 580 is added in indentation 550 as shown in FIG. 7. The spring-loaded member 580 is an arm configured to pivot with respect to the top of shift gate 500. The arm 580 is spring-mounted to the shift gate 500 by a rotational spring 590. Surface 600 acts as a wall to prevent overshoot of indentation 540 when the arm 580 is in the restriction position (as shown in FIG. 7). Surface 600 also at least partially defines the depth of the indentation 550. Since surface 600 is movable with respect to the floor pan or shift gate 500, indentation 550 has a flexible depth. Surface 600 engages the pawl pin when the arm 580 is rotated rearward and spring 590 is compressed. The arm 580 is biased toward a forward position or restricted position when the spring 590 is uncompressed.

Figure 8:
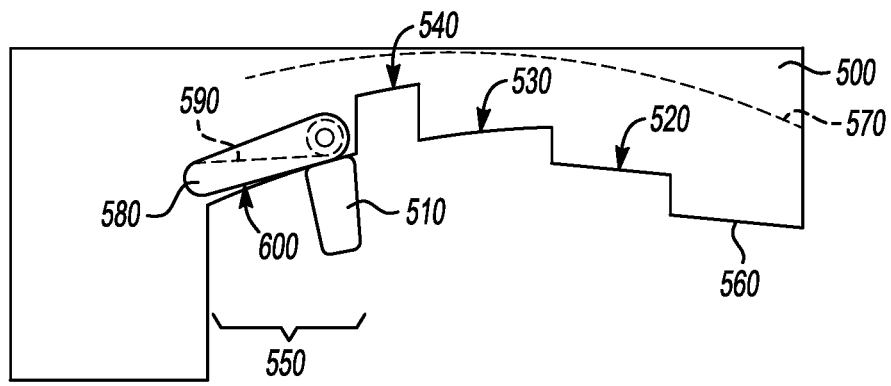
FIG. 8 is a cross-sectional view of another exemplary shifter assembly with the shift gate indentation arm of FIG. 7 in a reception depth.

FIGS. 7 and 8 show indentation 550 defining a restriction depth and reception depth, respectively. Arm 580 is retractable, when spring 590 is compressed surface 600 on arm is positioned at a greater depth than when in the restricted position. The restriction depth is less than the reception depth—i.e., when the spring 590 is compressed. In the restricted position arm 580 has a depth that is less than the depth of indentation 530 or indentation 540. Since indentation 550 is shallower than indentations 530 and 540 it is more difficult to overshoot indentation 540. When pawl 510 is engaged with the indentation 550, the depth of indentation 550 is still less than the depth of indentation 530. The difference in depth between indentations 530 and 550 is within a predetermined range e.g., within +/−10% of the depth of indentation 530. An exemplary depth for indentation 530 is 4 millimeters and an exemplary depth for indentation 550 in the reception position is 3.6 millimeters.

The present teachings enable use of a method of mitigating overshoot in a transmission shift selector. The method includes the steps of: forming a shift gate with a plurality of indentations that correspond to different shift selections; and altering the depth of at least one indentation in the shift gate between a restricted position and a receptive position (e.g., as shown and discussed with respect to FIGS. 2 through 8). The restricted position (or depth) of the indentation mitigates overshoot in a first direction and the receptive position (or depth) mitigates overshoot in a second direction. For example, as taught with respect to FIGS. 2-4, the restricted position of the indentation 210 mitigates overshoot of indentation 200 in a first direction and the receptive position (or depth) of indentation 210 mitigates overshoot of indentation 200 in a second direction. The flexible depth of indentation 210 mitigates position overshoot in multiple directions. Altering the depth of the indentation can include spring-mounting a member with respect to the shift gate (e.g., as shown with respect to the plunger 240 and rotational arms 400 and 580, as shown in FIGS. 5-6 and 7-8, respectively). Shift gate can include other means for having a flexible depth including having a malleable material included therein (e.g., a rubber or foam); a leaf spring incorporated therein; a pneumatic damper; or a solenoid. The method also includes chamfering the edge of at least one indentation in the shift gate to guide a pawl pin with respect to that indentation (as shown in FIGS. 3-4).

It will be apparent to those skilled in the art that various modifications and variations can be made to the methodologies of the present invention without departing from the scope its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

The invention claimed is:

1. A method of mitigating overshoot in a transmission shift selector, comprising:
   providing a shift gate with indentations that correspond to different shift selections; and
   changing the depth of one of the indentations between a restricted position that blocks a pawl from engaging the one indentation and a receptive position that allows a radially outer surface of the pawl to contact the indentation.

2. The method of claim 1, wherein changing the depth of the one indentation includes spring-mounting a member with respect to the one indentation.

3. The method of claim 1, further comprising:
   chamfering the edge of a second one of the indentations in the shift gate to guide the pawl with respect to the second of the indentations.

4. The method of claim 1, wherein the restricted position mitigates overshoot in a first direction and wherein the receptive position mitigates overshoot in a second direction.

5. A method of mitigating overshoot in a transmission shift selector, comprising:
   providing a shiftgate having multiple indentations of different radial distances from a pivot;
   moving a plunger relative to one of the indentations, producing a greater radial distance from the pivot that admits a pawl into the one indentation;
   moving the plunger relative to the one indentation, producing a lesser radial distance from the pivot that restricts the pawl from the one indentation.

6. The method of claim 5 further comprising:
   moving the shift selector between a first indentation of the shiftgate corresponding to a first shift selection, a second indentation of the shiftgate corresponding to a second shift selection positioned aft of the first indentation, and the one indentation positioned aft of the second shift selection.

7. The method of claim 6 wherein the second shift selection position corresponds to a Drive selection and the one indentation corresponds to a Manual selection.

8. The method of claim 5 wherein moving the plunger to produce a greater radial distance includes moving the plunger against a bias of a spring attached to the plunger.

9. A method of mitigating overshoot in a transmission shift selector, comprising:
   forming a shift gate with a plurality of indentations that correspond to different shift selections;
   altering the depth of at least one indentation in the shift gate between a restricted position and a receptive position;
   wherein the restricted position mitigates overshoot in a first direction and wherein the receptive position mitigates overshoot in a second direction; and
   wherein the altering the depth of the indentation includes spring-mounting a member with respect to the shift gate within one of the indentations.

* * * * *